United States Patent
Sun et al.

(10) Patent No.: US 9,946,006 B2
(45) Date of Patent: Apr. 17, 2018

(54) BACKLIGHT UNIT AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yanjun Sun, Beijing (CN); Woong Kim, Beijing (CN); Zhanchang Bu, Beijing (CN); Jing Yuan, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 532 days.

(21) Appl. No.: 14/429,505

(22) PCT Filed: Jul. 3, 2014

(86) PCT No.: PCT/CN2014/081578
§ 371 (c)(1),
(2) Date: Mar. 19, 2015

(87) PCT Pub. No.: WO2015/109771
PCT Pub. Date: Jul. 30, 2015

(65) Prior Publication Data
US 2016/0003999 A1   Jan. 7, 2016

(30) Foreign Application Priority Data
Jan. 27, 2014   (CN) .......................... 2014 1 0039107

(51) Int. Cl.
*F21V 8/00* (2006.01)

(52) U.S. Cl.
CPC ......... *G02B 6/0033* (2013.01); *G02B 6/0055* (2013.01); *G02B 6/0073* (2013.01)

(58) Field of Classification Search
CPC .................................................. G02B 6/0018
See application file for complete search history.

(56) References Cited

U.S. PATENT DOCUMENTS

2004/0130883 A1*   7/2004   Leu ....................... G02B 6/0043
                                                                362/624
2014/0226312 A1    8/2014   Park et al.

FOREIGN PATENT DOCUMENTS

CN        201521863 U      7/2010
CN        102080789 B      8/2012
(Continued)

OTHER PUBLICATIONS

Third Chinese Office Action of Chinese Application No. 201410039107.7, dated Mar. 16, 2016 with English translation.
(Continued)

*Primary Examiner* — Andrew Coughlin
(74) *Attorney, Agent, or Firm* — Collard & Roe, P.C.

(57) ABSTRACT

A backlight unit (10) and a display device are provided. The backlight unit (10) comprises a light guide plate (101), and a light source (102), a first reflective film (101), and a second reflective film (104). The light source (102) includes a plurality of LEDs (1021) uniformly arranged. The first reflective film (103) is disposed correspondingly on a backlight side of a region opposite to each of the LEDs on the light guide plate (101); The second reflective film (104) includes at least one first sub-reflective film (1041), the first sub-reflective film (1041) being disposed correspondingly on a backlight side of a region opposite to a gap between two adjacent LEDs on the light guide plate (101). A reflectivity of the first reflective film is less than a reflectivity of the second reflective film, and a distance between the light guide plate (101) and the LEDs is less than a distance between an intersection of light beams emitted by two adjacent LEDs and the LEDs, and, a width of the frame of the display device can be reduced.

20 Claims, 4 Drawing Sheets

(56) References Cited

FOREIGN PATENT DOCUMENTS

| | | |
|---|---|---|
| CN | 203082714 U | 7/2013 |
| CN | 103256563 A | 8/2013 |
| CN | 103807674 A | 5/2014 |
| JP | 2004145035 A | 5/2004 |
| JP | 2007294372 A | 11/2007 |
| WO | 2013/019023 A2 | 2/2013 |
| WO | 2013/035909 A1 | 3/2013 |

OTHER PUBLICATIONS

Second Chinese Office Action of Chinese Application No. 201410039107.7, dated Nov. 20, 2015 with English translation.
Chinese Office Action of Chinese Application No. 201410039107.7, dated Jul. 3, 2015 with English translation.
International Search Report with Notice of Transmittal of the International Search Report of PCT/CN2014/081578 in Chinese, dated Oct. 27, 2014.
Written Opinion of PCT/CN2014/081578 in Chinese with English translation, dated Oct. 27, 2014.

* cited by examiner

BACKLIGHT UNIT AND DISPLAY DEVICE

CROSS REFERENCE TO RELATED APPLICATIONS

This application is the National Stage of PCT/CN2014/081578 filed on Jul. 3, 2014, which claims priority under 35 U.S.C. § 119 of Chinese Application No. 201410039107.7 filed on Jan. 27, 2014, the disclosure of which is incorporated by reference.

TECHNICAL FIELD

Embodiments of the invention relate to a backlight unit and a display device.

BACKGROUND

Currently, Liquid Crystal Display (LCD) has become a mainstream in the flat panel display field. Because the liquid crystal per se is not luminous, the LCD needs to display images through transmission or reflection of a light source located external to the LCD. Most of the LCDs display images through transmission of a backlight; in recent years, in order to improve sharpness of the LCDs and reduce chromatic aberration of the image displayed, most transmissive LCD backlights all use LEDs as light sources.

When the LCD operates, light emitted from the LEDs passes through the light guide plate, and uniformly irradiates the LCD, so that the LCD displays images. The light emitted from the LEDs is in a fan-shaped distribution, and light emitted from two adjacent LEDs will converge after a certain distance; if an edge of the display panel of the LCD is within this distance, dark spots will appear in a region opposite to a gap between adjacent LEDs on the display panel, and bright spots will appear in a region facing the LEDs. Such a phenomenon is known as a firefly phenomenon, which shall affect the display quality of the LCD. At present, in order to avoid the firefly phenomenon, the edge of the light guide plate needs to be arranged in a region after the light beams emitted from two adjacent LEDs have converged, that is, a distance between the light guide plate and the LEDs is greater than or equal to a distance between an intersection of light beams emitted from two adjacent LEDs and the LEDs. The light guide plate is located on a backlight side of the display panel, for providing a uniform backlight for the display panel; however, when the edge of the light guide plate on one side close to the LEDs is located in the region after the light beams emitted from two adjacent LEDs have converged, it will lead to a greater distance between the LEDs and the display panel, and finally result in a broader frame of the LCD.

SUMMARY OF THE INVENTION

According to an embodiment of the present invention, a backlight unit is provided, comprising a light guide plate, and a light source, the light source including a plurality of LEDs uniformly arranged, wherein the backlight unit further comprises:

A first reflective film disposed correspondingly on a backlight side of a region opposite to each of the LEDs on the light guide plate;

A second reflective film including at least one first sub-reflective film, the first sub-reflective film being disposed correspondingly on a backlight side of a region opposite to a gap between two adjacent LEDs on the light guide plate;

A reflectivity of the first reflective film is less than a reflectivity of the second reflective film, and a distance between the light guide plate and the LEDs is less than a distance between an intersection of light beams emitted by two adjacent LEDs and the LEDs.

For example, the second reflective film further includes a second sub-reflective film, the second sub-reflective film being disposed correspondingly on a backlight side of a region opposite to a power wiring of the plurality of LEDs uniformly arranged on the light guide plate.

For example, a width of a side of each first sub-reflective film close to the LED is greater than a width of a side of each first sub-reflective film away from the LEDs, and a direction along the width of the first sub-reflective film is parallel to an arrangement direction of the plurality of LEDs.

For example, the first sub-reflective film is in any shape of triangular, semicircular, semi-elliptical or semi-polygonal.

For example, a shape of the second reflective film is complementary to a shape of the first reflective film, a shape of a combined film constituted by the first reflective film and the second reflective film is the same as a shape of the light guide plate, and an area of the combined film is greater than an area of a display side of the light guide plate.

For example, the second reflective film is located on a backlight side of the light guide plate;

The first reflective film is located on a backlight side of the second reflective film, and is in a shape the same as the light guide plate, and an area of the first reflective film is greater than an area of a display side of the light guide plate.

For example, the second reflective layer is directly disposed in a region opposite to a gap between each two of the LEDs on a backlight side of the light guide plate.

According to an embodiment of the invention, a display device is provided, comprising any backlight as described above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
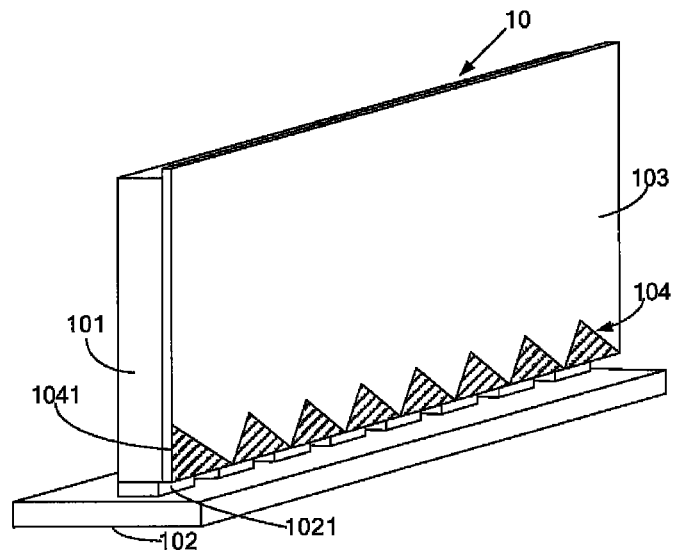
FIG. 1 is a schematic diagram of a backlight unit provided by an embodiment of the invention.

An embodiment of the invention provides a backlight unit 10, as illustrated in FIG. 1, comprising a light guide plate 101, and a light source 102, the light source 102 including a plurality of LEDs 1021 uniformly arranged; and the backlight unit further comprises:

A first reflective film 103, the first reflective film 103 being disposed correspondingly on a backlight side of a region opposite to each of the LEDs 1021 on the light guide plate 101.

A second reflective film 104, the second reflective film 104 including at least one first sub-reflective film 1041, the first sub-reflective film 1041 being disposed correspondingly on a backlight side of a region opposite to a gap between two adjacent LEDs 1021 on the light guide plate 101.

A reflectivity of the first reflective film 103 is less than a reflectivity of the second reflective film 104, and a distance between the light guide plate 101 and the LEDs 1021 is less than a distance between an intersection of light beams emitted by two adjacent LEDs 1021 and the LEDs 1021.

Figure 2:
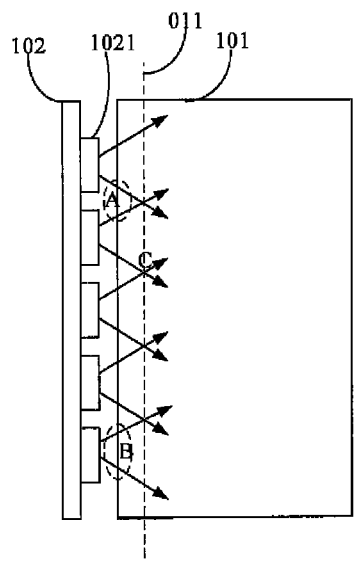
FIG. 2 is a schematic diagram of a firefly phenomenon.

As illustrated in FIG. 2, light emitted from the LEDs 1021 irradiates the light guide plate 101, arrows in FIG. 2 indicate a range that the light emitted from the LEDs 1021 can irradiate, a region opposite to an LED on the light guide plate 101 is illustrated as a region B in the diagram, and a region opposite to a gap between each two adjacent LEDs on the light guide plate 101 is illustrated as a region A in the diagram; if the light source 102 is close to the light guide plate 101, the region B looks bright due to direct irradiation of the light emitted from the LEDs, and the region A appears dark because of no direct irradiation, and such a phenomenon is known as a firefly phenomenon. The light guide plate 101 is located on a backlight side of a display panel of the display device, and the light passing through the light guide plate 101 and then a series of optical films, can provide the display panel with uniform backlight. If, after the light enters the optical films via the light guide plate 101, among luminance values of a preset number of detection points on a display side of the optical films, a ratio between a minimum luminance value and a maximum luminance value is greater than a preset luminance threshold, then it can be deemed that the display panel has a uniform backlight brightness. Exemplarily, the preset number of detection points on the display side of the optical films is 9, a preset luminance threshold is 76%; when the ratio between the minimum luminance value and the maximum luminance value among the luminance values of the 9 detection points is greater than 76%, then it is deemed that the display panel has a uniform backlight brightness. Therefore, if a severe firefly phenomenon appears on the light guide plate 101, this phenomenon will appear on the display panel of the display device, such that the backlight of the display panel is not uniform enough, thus affecting the display quality of the display device. In order to avoid the firefly phenomenon, generally it is necessary to make a distance between the light guide plate 101 and the LEDs greater than or equal to a distance between an interaction of light beams of two adjacent LEDs and the LEDs, that is, an edge of the light guide plate 101 close to the LEDs 1021 is located in a right-side region of a dashed line 011 as illustrated in FIG. 2, and the intersection point is a point C as illustrated in FIG. 2, to ensure that the light is uniformly distributed on the light guide plate 101, which however will lead to broader frame of the display device.

Figure 3:
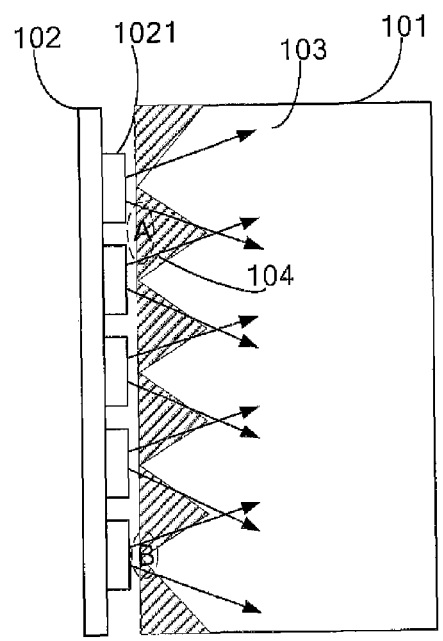
FIG. 3 is a structural schematic diagram of a reflective film provided by an embodiment of the invention.

According to the embodiment of the present invention, as illustrated in FIG. 1, when the distance between the light guide plate 101 and the LEDs 1021 is less than the distance between the interaction of light beams of two adjacent LEDs 1021 and the LEDs, a first reflective film 103 and a second reflective film 104 are disposed at a backlight side of the light guide plate 101, the first reflective film 103 being disposed on a backlight side of a region opposite to the LEDs on the light guide plate 101, the second reflective film 104 including at least one first sub-reflective film 1041, the first sub-reflective film 1041 being disposed on a backlight side of a region opposite to a gap between two adjacent LEDs on the light guide plate 101, and a reflectivity of the first reflective film 103 being less than a reflectivity of the second reflective film 104; as illustrated in FIG. 3, after the light enters the light guide plate 101, light directly irradiated by the LEDs 1021 to a region opposite to the LEDs 1021 on the light guide plate 101 is reflected by the first reflective film 103, while light entering a region opposite to a gap between two adjacent LEDs 1021 on the light guide plate 101 is reflected by the second reflective film 104, that is, the light entering the region B is reflected by the first reflective film 103 with a low reflectivity, and the light entering the region A is reflected by the second reflective film 104 with a high reflectivity. Accordingly, a reasonable setting of reflectivity of the first reflective film 103 and the second reflective film 104 can make the region A and the region B identical in luminance, so as to eliminate the firefly phenomenon.

In this way, the light entering the light guide plate is reflected by the first reflective film and the second reflective film, such that the outgoing light of the light guide plate has more uniform luminance, which avoids the firefly phenomenon appearing in the display region when light source is too close to the display region, and thus, on the premise that the display quality of the display device is ensured, shortens the distance between the light guide plate and the light source, and further reduces the width of the frame of the display device.

Figure 4:
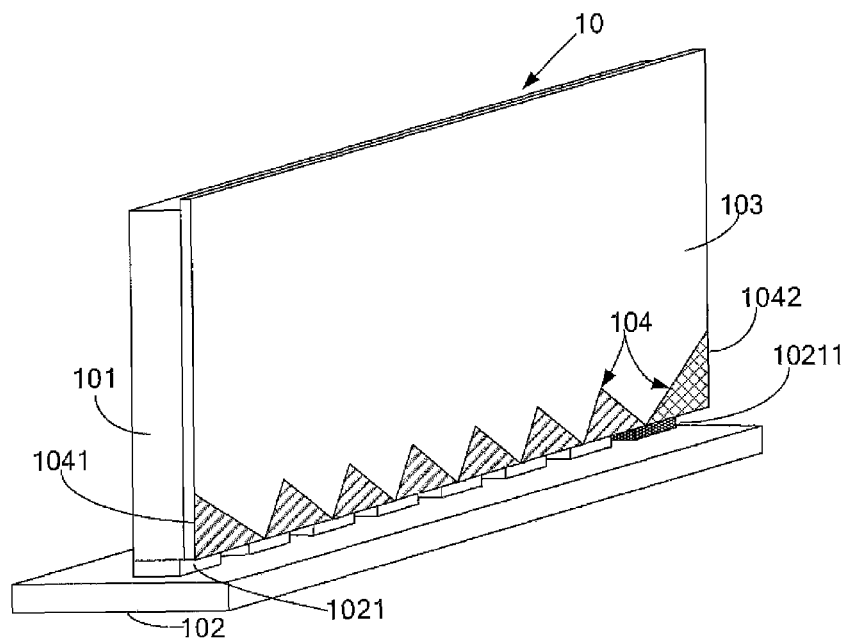
FIG. 4 is a schematic diagram of another backlight unit provided by an embodiment of the invention.
Figure 5:
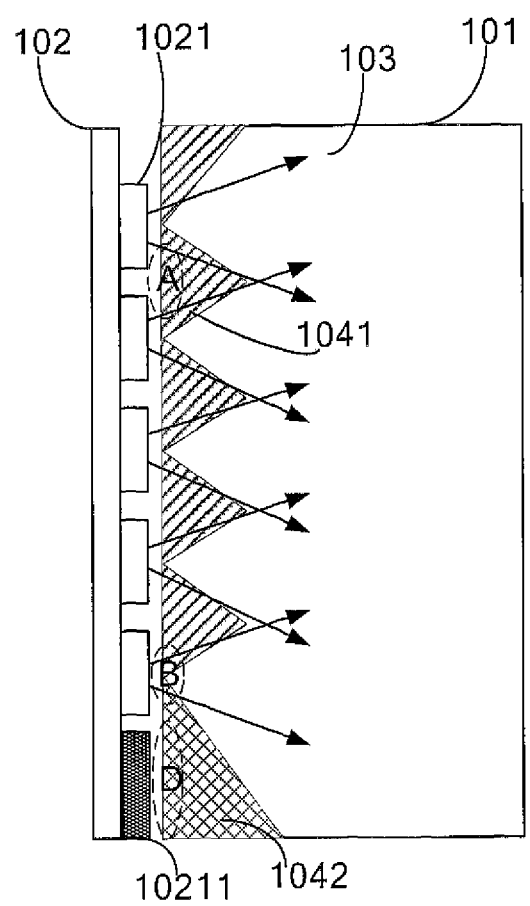
FIG. 5 is a structural schematic diagram of another reflective film provided by an embodiment of the invention.

Further, as illustrated in FIG. 4, the second reflective film 104 may further include a second sub-reflective film 1042, the second sub-reflective film 1042 being disposed on a backlight side of a region opposite to a power wiring 10211 on the light guide plate 101, the power wiring 10211 being located on one end of a plurality of LEDs 1021 uniformly arranged, to supply power for the plurality of LEDs 1021, and the second sub-reflective film 1042 having a reflectivity greater than that of the first reflective film 103. As illustrated in FIG. 5, arrows in FIG. 5 indicate a range that the light emitted from the LEDs 1021 can irradiate, a region opposite to an LED on the light guide plate 101 is illustrated as a region B in the diagram, and a region opposite to a gap between each two adjacent LEDs is illustrated as a region A in the diagram, a region opposite to the LED power wiring 10211 is illustrated as a region D in the diagram; the light entering the region B is reflected by the first reflective film 103, the light entering the region A is reflected by the first sub-reflective film 1041, and the light entering the region D is reflected by the second sub-reflective film 1042, so a reasonable setting of the reflectivity of the first reflective film 103, the second reflective film 104 and the second sub-reflective film 1042 can make the region A, region B and region D have equal or similar luminance. The reflectivity of the second sub-reflective film 1042 and that of the first sub-reflective film 1041 may or may not be equal. In practical application, in order to facilitate the fabrication, usually the reflectivity of the second sub-reflective film 1042 is equal to that of the first sub-reflective film 1041.

Figure 6:
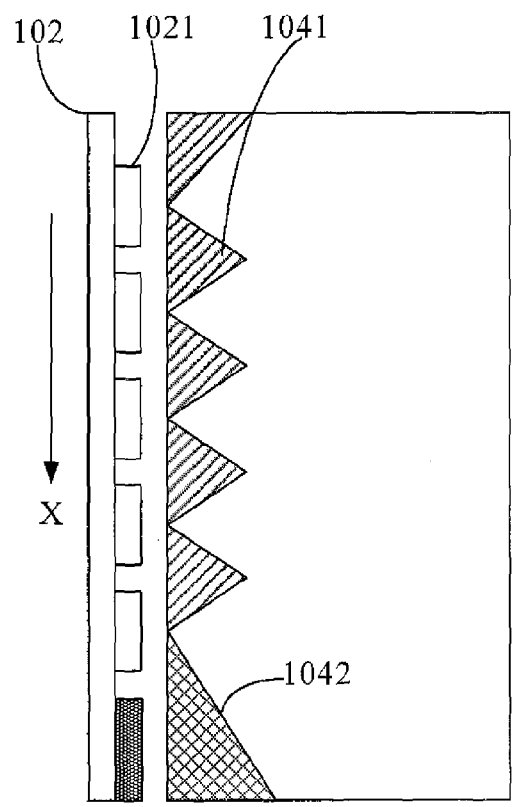
FIG. 6 is a diagram of schematic shape of a reflective film provided by an embodiment of the invention.

For example, as illustrated in FIG. 6, a width of a side of each first sub-reflective film 1041 of the second reflective film 104 close to the LEDs 1021 is greater than a width of a side away from the LEDs, and a direction along the width of the first sub-reflective film 1041 is parallel to an arrangement direction of the plurality of LEDs 1021 uniformly arranged; an X direction illustrated in the diagram is the arrangement direction of the plurality of LEDs 1021 uniformly arranged, the width of the first sub-reflective film 1041 is its size along the X direction in the diagram, and the width of the first sub-reflective film 1041 gradually decreases along the direction from a position close to the LEDs to a position away from the LEDs; by using such a scheme, the outgoing light of the light guide plate 101 may have a more uniform luminance. For example, the first sub-reflective film 1041 is in any shape of triangular, semi-circular, semi-elliptical or semi-polygonal; the semi-elliptical shape is any half of two halves obtained by dividing an ellipse along a major axis or a minor axis, and the semi-polygonal shape is any half of two halves obtained by dividing a polygon along its central axis. The embodiment of the invention is illustrated by taking a triangular shape as an example, but it does not limit the specific shape of the first sub-reflective film 1041.

For example, the second reflective film 104 and the first reflective film 103 may be in a same plane, and a shape of the second reflective film 104 is complementary to a shape of the first reflective film 103, i.e., the second reflective film 104 is disposed in a region other than the region where the first reflective film 103 is disposed, such that the light entering the light guide plate 101 can be uniformly reflected, and the outgoing light of the light guide plate 101 has more uniform luminance. In practical application, a shape of a combined film constituted by the first reflective film 103 and the second reflective film 104 is the same as a shape of the light guide plate 101, and the combined film is located on a backlight side of the light guide plate 101. For the backlight unit, a side of the light guide plate facing the liquid crystal panel is called as a display side, and the other side opposite to the display side is called as a backlight side. The combined film may have an area slightly greater than that of the display side of the light guide plate, such that the light entering the light guide plate all can be reflected by the combined film, so as to improve light availability.

Figure 7:
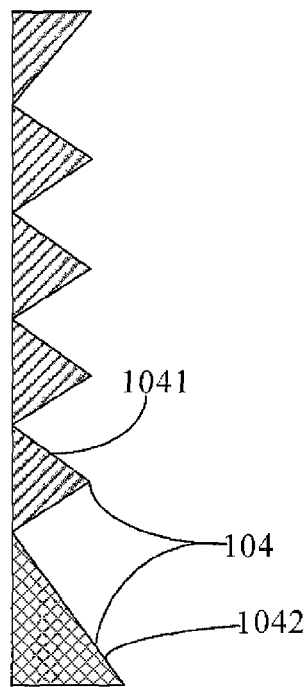
FIG. 7 is a diagram of schematic shape of a reflective film provided by an embodiment of the invention.

It should be noted that the shape of the second reflective film 104 may also be as that illustrated in FIG. 7, the second reflective film 104 may serve as an independent reflective film, located on the backlight side of the light guide plate 101 and tightly close to the light guide plate 101, the first sub-reflective film 1041 of the second reflective film 104 corresponds to a region opposite to a gap between each two adjacent LEDs on the light guide plate 101, and the second sub-reflective film 1042 of the second reflective film 104 corresponds to a region opposite to the LED power wiring on the light guide plate 101, such that light entering the region opposite to each two adjacent LEDs on the light guide plate 101 is reflected by the first sub-reflective film 1041, and light entering the region opposite to the LED power wiring on the light guide plate 101 is reflected by the second sub-reflective film 1042. The first reflective film 103 may serve as an independent reflective film, located in the backlight side of the second reflective film 104 and tightly close to the second reflective film 104, and the shape of the first reflective film 103 may be the same as the shape of the light guide plate 101. For example, an area of the combined film constituted by the first reflective film 103 and the second reflective film 104 may be slightly greater than an area of the display side of the light guide plate 101, in order to ensure that the light entering the regions opposite to the LEDs can be reflected by the first reflective film 103, while the light in other regions can be reflected by the second reflective film 104, such that the light entering the light guide plate 101 can be sufficiently reflected, so as to avoid the firefly phenomenon, and improve the light availability.

Further, for example, the second reflective film 104 may also be directly disposed in a region opposite to a gap between each two of the LEDs on a backlight side of the light guide plate 101. Specifically, the second reflective film 104 can be coated on a corresponding region of the light guide plate 101 by a coating process, and then the first reflective film is disposed on the backlight side of the light guide plate, wherein the first reflective film may be in a shape the same as the light guide plate, and may have an area slightly greater than that of the light guide plate.

The backlight unit provided by the embodiment of the invention, comprises a light guide plate and a light source, and the backlight unit further comprises a first reflective film and a second reflective film, the first reflective film having a reflectivity less than that of the second reflective film, such that the light entering the regions opposite to the LEDs on the light guide plate is reflected by the first reflective film, and the light entering the other regions on the light guide plate is reflected by the second reflective film, which avoids the firefly phenomenon caused by too close distance between the light guide plate and the LEDs, and further reduces the size of the frame of the display device.

An embodiment of the invention provides a display device, comprising the backlight unit according to any of the above embodiments. The backlight unit includes a light guide plate and a light source, the light source including a plurality of LEDs uniformly arranged; and the backlight unit further includes: a first reflective film, the first reflective film being disposed correspondingly on a backlight side of a region opposite to each of the LEDs on the light guide plate; a second reflective film, the second reflective film including at least one first sub-reflective film, the first sub-reflective film being disposed correspondingly on a backlight side of a region opposite to a gap between two adjacent LEDs on the light guide plate; a reflectivity of the first reflective film being less than a reflectivity of the second reflective film; after entering the light guide plate, the light is reflected by the first reflective film and the second reflective film, which avoids the firefly phenomenon caused by too close distance between the light source and the display region.

In the display device provided by the embodiment of the invention, the backlight unit of the display device includes a light guide plate, a light source, a first reflective film and a second reflective film, and the first reflective film has a reflectivity less than that of the second reflective film, such that the light entering the regions opposite to the LEDs on the light guide plate is reflected by the first reflective film, and the light entering the other regions on the light guide plate is reflected by the second reflective film, which allows the outgoing light of the light guide plate to have a more uniform luminance, avoids the firefly phenomenon caused by too close distance between the light guide plate and the LEDs, and further reduces the size of the frame of the display device.

An embodiment of the invention provides a fabrication method of a backlight unit, the backlight unit including a light guide plate, and a light source, the light source including a plurality of LEDs uniformly arranged, the fabrication method comprising:

Step 801: arranging a first reflective film in a corresponding region opposite to a region of each of the LEDs on a backlight side of the light guide plate.

Step 802: arranging a second reflective film on the backlight side of the light guide plate, the second reflective film including at least one first sub-reflective film, the first sub-reflective film being disposed correspondingly in a region opposite to a gap between two adjacent LEDs on the backlight side of the light guide plate.

A reflectivity of the first reflective film is less than that of the second reflective film; in this way, after entering the light guide plate, the light is reflected by the first reflective film and the second reflective film, such that the outgoing light of the light guide plate has more uniform luminance, which avoids the firefly phenomenon caused by too close distance between the light source and the display region.

Further, a second sub-reflective film is disposed correspondingly in a region opposite to a power wiring of the plurality of LEDs uniformly arranged on the light guide plate, such that light entering the region opposite to the LEDs is reflected by a reflective film with a small reflectivity, and light entering the region opposite to the LED power wiring is reflected by a reflective film with a large reflectivity, and accordingly, the outgoing light of the region of the light guide plate opposite to the LED power wiring and the outgoing light of the region of the light guide plate opposite to the LEDs have equal luminance. The reflectivity of the second sub-reflective film and that of the first sub-reflective film may or may not be equal. In practical application, in order to facilitate the fabrication, usually the reflectivity of the second sub-reflective film is equal to that of the first sub-reflective film.

For example, arranging the second reflective film on the backlight side of the light guide plate includes:

Coating the first sub-reflective film in a region opposite to a gap between two adjacent LEDs on the backlight side of the light guide plate by a coating process; and coating a second sub-reflective film in a region opposite to a power wiring of the plurality of LEDs on the backlight side of the light guide plate by a coating process. The second reflective film is directly coated on the backlight side of the light guide plate by a coating process, which saves space, and allows a better reflectivity of the second reflective film.

Generally, the backlight side of the light guide plate has a reflective film with uniform reflectivity, which can sufficiently reflect the light entering the light guide plate; however, when the light guide plate is too close to the light source, a firefly phenomenon cannot be avoided. According to the embodiment of the invention, a second reflective film can be coated on the above-described reflective film with a uniform reflectivity by a coating process, that is, a coated portion is the second reflective film, and an uncoated portion is the first reflective film, such that the first reflective film corresponds to a region opposite to the LEDs on the backlight side of the light guide plate, and the second reflective film corresponds to the remaining region of the backlight side of the light guide plate. Such a scheme can also make the outgoing light obtained after the light passes through the light guide plate have more uniform luminance.

In the fabrication method of the backlight unit provided by the embodiment of the invention, a first reflective film is disposed correspondingly in a region opposite to each of the LEDs on a backlight side of a light guide plate, and a second reflective film is disposed on the backlight side of the light guide plate; the second reflective film includes at least one first sub-reflective film, the first sub-reflective film being disposed correspondingly in a region opposite to a gap between two adjacent LEDs on the backlight side of the light guide plate, and the second reflective film further includes a second sub-reflective film, the second sub-reflective film being disposed correspondingly on a backlight side of a region opposite to a power wiring of the plurality of LEDs on the light guide plate, so, after entering the light guide plate, the light is reflected by the first reflective film and the second reflective film, such that the outgoing light of the light guide plate has more uniform luminance, which avoids the firefly phenomenon caused by too close distance between the light guide plate and the LEDs, and further reduces the size of the frame of the display device.

The foregoing embodiments merely are exemplary embodiments of the invention, and not intended to define the scope of the invention, and the scope of the invention is determined by the appended claims.

CROSS-REFERENCE TO RELATED APPLICATIONS

The present application claims priority of Chinese Patent Application No. 201410039107.7 filed on Jan. 27, 2014, the disclosure of which is incorporated herein by reference in its entirety as part of the present application.

What is claimed is:

1. A backlight unit, comprising a light guide plate, and a light source, the light source including a plurality of LEDs uniformly arranged, wherein the backlight unit further comprises:
    a first reflective film disposed correspondingly on a backlight side of a region opposite to each of the LEDs on the light guide plate;
    a second reflective film including at least one first sub-reflective film, the first sub-reflective film being disposed correspondingly on a backlight side of a region opposite to a gap between two adjacent LEDs on the light guide plate;
    a reflectivity of the first reflective film being less than a reflectivity of the second reflective film, and a distance between the light guide plate and the LEDs being less than a distance between an intersection of light beams emitted by two adjacent LEDs and the LEDs, a shape of a combined film constituted by the first reflective film and the second reflective film is the same as a shape of the light guide plate, and an area of the combined film is greater than an area of a display side of the light guide plate.

2. The backlight unit according to claim 1, wherein the second reflective film further includes a second sub-reflective film, the second sub-reflective film being disposed correspondingly on a backlight side of a region opposite to a power wiring of the plurality of LEDs uniformly arranged on the light guide plate.

3. The backlight unit according to claim 2, wherein a shape of the second reflective film is complementary to a shape of the first reflective film.

4. The backlight unit according to claim 2, wherein
    the second reflective film is located on a backlight side of the light guide plate;
    the first reflective film is located on a backlight side of the second reflective film, and is in a shape the same as the light guide plate, and an area of the first reflective film is greater than an area of a display side of the light guide plate.

5. The backlight unit according to claim 2, wherein the second reflective layer is directly disposed in a region opposite to a gap between each two of the LEDs on a backlight side of the light guide plate.

6. The backlight unit according to claim 1, wherein a width of a side of each first sub-reflective film close to the LEDs is greater than a width of a side of each first sub-reflective film away from the LEDs, and a direction along the width of the first sub-reflective film is parallel to an arrangement direction of the plurality of LEDs.

7. The backlight unit according to claim 6, wherein a shape of the second reflective film is complementary to a shape of the first reflective film.

8. The backlight unit according to claim 6, wherein
the second reflective film is located on a backlight side of the light guide plate;
the first reflective film is located on a backlight side of the second reflective film, and is in a shape the same as the light guide plate, and an area of the first reflective film is greater than an area of a display side of the light guide plate.

9. The backlight unit according to claim 6, wherein the second reflective layer is directly disposed in a region opposite to a gap between each two of the LEDs on a backlight side of the light guide plate.

10. The backlight unit according to claim 1, wherein the first sub-reflective film is in any shape of triangular, semi-circular, semi-elliptical or semi-polygonal.

11. The backlight unit according to claim 10, wherein a shape of the second reflective film is complementary to a shape of the first reflective film.

12. The backlight unit according to claim 10, wherein
the second reflective film is located on a backlight side of the light guide plate;
the first reflective film is located on a backlight side of the second reflective film, and is in a shape the same as the light guide plate, and an area of the first reflective film is greater than an area of a display side of the light guide plate.

13. The backlight unit according to claim 10, wherein the second reflective layer is directly disposed in a region opposite to a gap between each two of the LEDs on a backlight side of the light guide plate.

14. The backlight unit according to claim 1, wherein a shape of the second reflective film is complementary to a shape of the first reflective film.

15. The backlight unit according to claim 1, wherein
the second reflective film is located on a backlight side of the light guide plate;
the first reflective film is located on a backlight side of the second reflective film, and is in a shape the same as the light guide plate, and an area of the first reflective film is greater than an area of a display side of the light guide plate.

16. The backlight unit according to claim 1, wherein the second reflective layer is directly disposed in a region opposite to a gap between each two of the LEDs on a backlight side of the light guide plate.

17. A display device, comprising the backlight unit according to claim 1.

18. The display device according to claim 17, wherein the second reflective film further includes a second sub-reflective film, the second sub-reflective film being disposed correspondingly on a backlight side of a region opposite to a power wiring of the plurality of LEDs uniformly arranged on the light guide plate.

19. The display device according to claim 17, wherein a width of a side of each first sub-reflective film close to the LEDs is greater than a width of a side of each first sub-reflective film away from the LEDs, and a direction along the width of the first sub-reflective film is parallel to an arrangement direction of the plurality of LEDs.

20. The display device according to claim 17, wherein the first sub-reflective film is in any shape of triangular, semi-circular, semi-elliptical or semi-polygonal.

* * * * *